(12) United States Patent
Saito

(10) Patent No.: US 6,579,634 B2
(45) Date of Patent: Jun. 17, 2003

(54) MAGNETIC RECORDING MEDIUM

(75) Inventor: Akira Saito, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 91 days.

(21) Appl. No.: 09/746,441

(22) Filed: Dec. 18, 2000

(65) Prior Publication Data

US 2001/0006744 A1 Jul. 5, 2001

(30) Foreign Application Priority Data

Dec. 20, 1999 (JP) ............................................ 11-361727

(51) Int. Cl.$^7$ ............................... G11B 5/66; G11B 5/70
(52) U.S. Cl. ............. 428/694 T; 428/212; 428/694 TM; 428/900
(58) Field of Search ..................... 428/694 TM, 212, 428/900, 694 T

(56) References Cited

U.S. PATENT DOCUMENTS 5,643,686 A * 7/1997 Isshiki et al. ......... 428/694 BM
6,420,058 B1 * 7/2002 Haratani et al. ......... 428/694 T

OTHER PUBLICATIONS

S.Y. Chou, et al., "Quantized Magnetic Disks", Nano Structure Laboratory, Department of Electrical Engineering, University of Minnesota, Minneapolis, *J. Magn. Soc. Japan.*, vol. 21. No. 7 (1997).
R.M.H. New, et al., "Submicron Patterning of Thin Cobalt Films for Magnetic Storage", Department of Electrical Engineering, Stamford University, *J. Vac Sci. Technol. B.* 12(6), (1994).

* cited by examiner

Primary Examiner—Holly Rickman
(74) Attorney, Agent, or Firm—Darby & Darby

(57) ABSTRACT

A magnetic recording medium has a non-magnetic substrate, an under layer, a magnetic layer, and a protective layer in the recited order. The magnetic layer consists of a plurality of magnetic components embedded in a pattern in an isolating component. Each magnetic component includes at least one magnetic component of large coercive force and one of a magnetic component of small coercive force. The two components abut each other. In one embodiment the two components form one or more alternating layers. In another embodiment, one of the components has a recess in its upper surface which is filled with the other component. In still another embodiment, the two components are disposed side by side passing through the isolating component.

14 Claims, 9 Drawing Sheets

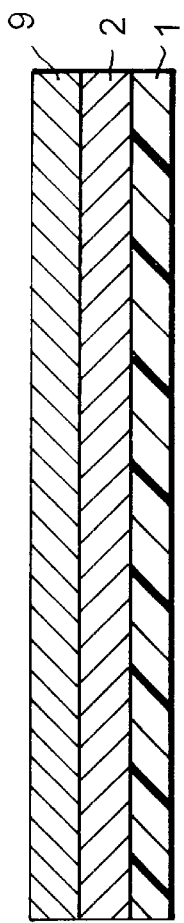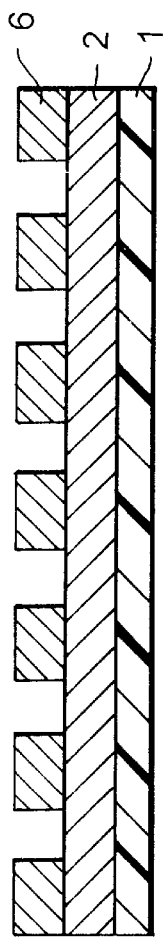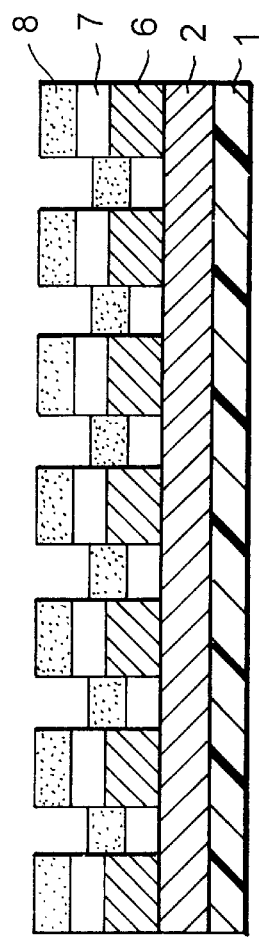

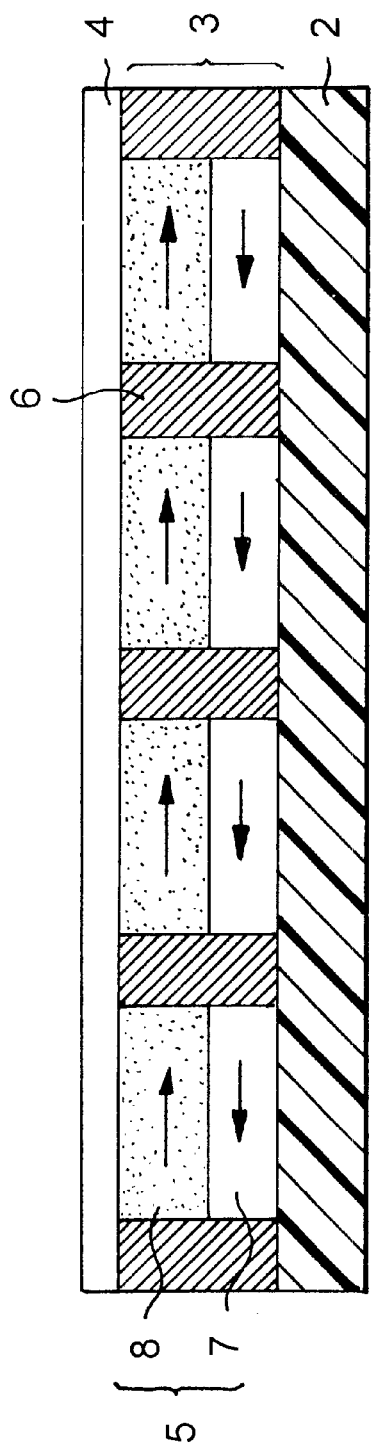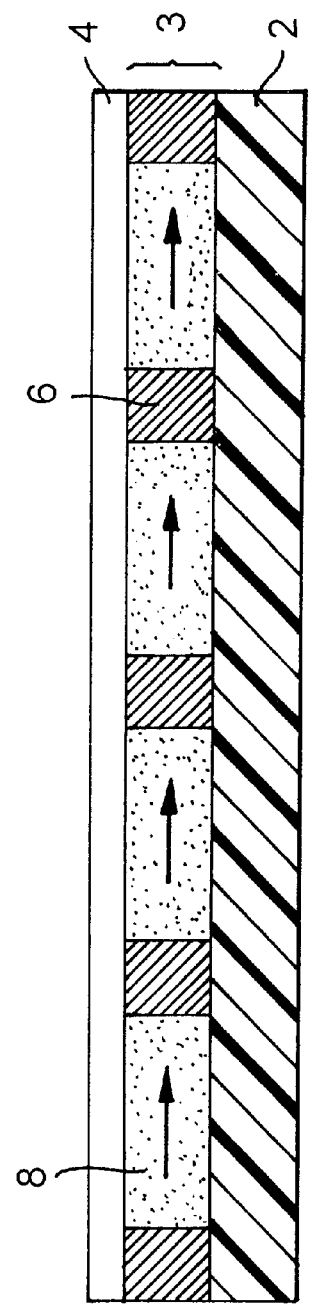
Fig. 9(a)
Fig. 9(b)

MAGNETIC RECORDING MEDIUM

BACKGROUND

1. Field of the Invention

The present invention relates to a magnetic recording medium of a hard disk drive (hereinafter abbreviated as HDD) widely employed in the external memory of computers.

2. Prior Art

At present, a magnetic recording medium used for hard disk drives has reached an areal density of 10 Gbits/in$^2$ on an experimental basis.

Referring to FIG. 10(a), a typical basic layered structure of a magnetic recording medium includes a non-magnetic substrate 1, upon which are deposited, in order, an under layer 2, tens of nanometers thick, a magnetic layer 3, from 10 to 20 nm thick, and a carbon protective layer 4, some 10 nm thick. Non-magnetic substrate 1 is typically a hard substrate made of aluminum alloy or glass, hundreds of micrometers thick. Under layer 2 is composed of pure chromium metal or a chromium alloy doped with molybdenum or tungsten. Magnetic layer 3 employs a cobalt alloy doped with chromium, nickel, tantalum, platinum etc. Under layer 2 seeds crystallinity in magnetic layer 3 formed thereon. Under layer 2, for instance, orients c axes of polycrystalline cobalt, which has a crystallographically hexagonal symmetry, in a magnetic layer 3 parallel to the substrate surface.

It is assumed that a conventional magnetic recording medium with all its layers manufactured by a sputtering technique has a maximum attainable areal density of tens of gigabits per square inch. An areal density of 10 Gbits/in$^2$ requires an area of some $6 \times 10^4$ nm$^2$ in the magnetic layer to record one bit. In order to reduce noise accompanying the read out of written bit information, the diameter of magnetic metal crystal grains in magnetic layer 3 must be reduced. Reducing crystal grain diameter, however, causes difficulty in retaining written information (the magnetization direction) when the crystal grains are subject to disturbance caused by thermal oscillation. Deliberation on the disturbance caused by thermal oscillation estimates for the present that the minimum crystal grain diameter enabling stable retainment of the magnetization direction is some 9 nm. This deduces that some 1000 crystal grains at an areal density of 10 Gbits/in$^2$ hold one-bit information, with crystal grain diameter minimized as far as thermal stability of the crystal grain permits.

The magnetic layer of a magnetic recording medium with a high areal density most conventionally uses cobalt magnetic alloy. Crystal grains of cobalt magnetic alloy have a hexagonal crystallographical structure. A magnetic layer formed by sputtering has non-magnetic crystal grains segregated at grain boundaries with magnetic crystal grain. Hence, the cobalt magnetic alloy has a crystalline structure in which magnetic metal crystal grains are surrounded by non-magnetic metal, such as chromium.

The presence of the non-magnetic metal among the magnetic metal crystal grains reduces interaction among magnetic crystal grains compared with those in the absence of non-magnetic metal. This reduces noise in the medium.

The above suggests that reducing interaction among magnetic crystal grains in a magnetic layer enables spontaneous reversal of the direction of magnetization of the magnetic crystal grains. Intense interaction among magnetic crystal grains directly contacting each other in a magnetic layer causes difficulty in reversing the magnetization direction of a specific crystal grain when the magnetization direction of surrounding crystal grains remains unreversed.

Referring now to FIG. 10(b), magnetic layer 3 consists of magnetic metal crystal grains 13 and non-magnetic metal 14. In the absence of under layer 2, the directions of the c axes of magnetic metal crystal grains are randomly oriented, as indicated by the random directions of arrows. Under layer 2 (FIG. 10(a)) eliminates the random orientation in c axes of magnetic metal crystal grains 13 and arranges them in a specified orientation. Disturbance caused by thermal oscillation, however, increases randomness of orientation in c axes, when the diameter of magnetic metal crystal grains 13 is reduced.

Referring now to FIG. 11, in order to eliminate the instability in the magnetization direction of magnetic metal crystal grains 13 on reducing diameter thereof, a magnetic recording medium may be modified as shown. As in the embodiment in FIG. 10(a), the medium consists of a non-magnetic substrate 1, an under layer 2, a magnetic layer 3, and a protective layer 4, in that order starting at the non-magnetic substrate 1. Non-magnetic substrate 1 is made of silicon. Magnetic layer 3 is composed of a plurality of spaced-apart magnetic metal crystalline column 15. A silicon oxide film 16 fills the spaces between the magnetic crystalline columns 15 to embed the magnetic metal crystalline columns 15 in the silicon oxide film 16. The silicon oxide film isolates each magnetic metal crystalline column 15 from its neighbors. This type of magnetic recording medium is known as a quantized magnetic disk (hereinafter abbreviated as QMD). A magnetic metal crystalline column 15 surrounded by silicon oxide 15 in the magnetic layer 3 corresponds to one bit.

The shape of the magnetic metal crystalline columns 15 determines their spontaneous magnetic orientation (magnetic orientation in the absence of a magnetic field). When a narrow magnetic metal crystalline column 15 situated in a long and narrow hole of silicon oxide film 16 in a QMD, spontaneous magnetization of the magnetic crystalline columns 15 is oriented perpendicular to the surface of a silicon substrate 1. By changing the shape of the magnetic metal crystalline columns it is possible to orient the spontaneous magnetization of a QMD parallel to the surface of a silicon substrate 1. The long and narrow magnetic metal crystalline columns 15 in the QMD of FIG. 11 have the identical orientation in spontaneous magnetization. That is, all magnetic metal crystalline columns 15 have spontaneous magnetization directed perpendicular to the surface of a silicon substrate 1. This limits magnetization only to upward or downward directions. This takes advantage of the constraint of vertical orientation of spontaneous magnetization to reduce the energy of shape anisotropy of the magnetic domains.

Before the development of the QMD, each crystalline region, which may be composed of 1000 weakly combined magnetic crystal grains, corresponded to one bit in a magnetic recording medium. In a QMD, on the other hand, each magnetic metal crystalline column 15 corresponding to one bit is isolated magnetically from all of its neighbors. The crystal grains in a magnetic metal crystalline column 15 are composed of ferromagnetic metal without the presence of non-metal material. The magnetic forces of the crystal grains combine with each other with large exchange forces to cause the magnetic metal crystalline column 15 to behave like a large single magnetic crystal. As a result, the amount of thermal energy required to reverse the magnetization direction in one bit region of a QMD is larger than is the case with a conventional medium that has magnetic metal crystal grains segregated by non-magnetic metal crystal grains. This provides a QMD with improved thermal stability in magnetization.

OBJECTS AND SUMMARY OF THE INVENTION

It is an object of the invention to provide a QMD with a magnetic metal crystalline column evenly isolated in oxide in a magnetic layer that has increased coercive force through surface magnetic anisotropy.

It is a further object of the invention to provide a material for the magnetic layer of a QMD which exhibits increased coercive force.

It is a still further object of the invention to provide a magnetic recording medium with a magnetic layer whose magnetization is less subject to the materials it contains.

It is a further object of the invention to provide a magnetic layer for a QMD that has improved thermal stability in magnetization as well as improved evenness and orderly distribution of magnetic components therein.

A first magnetic recording medium of the present invention to solve the problem comprises a non-magnetic substrate, an under layer, a magnetic layer, a protective layer. The under layer, magnetic layer, and protective layer are formed in that order one on top of another on the non-magnetic substrate. The magnetic layer consists of a plurality of magnetic components, and an isolating component. The magnetic components are distributed evenly spaced apart in the isolating component. Each magnetic component is composed of a hard magnetic layer having a large coercive force, and a soft magnetic layer having a small coercive force placed side by side. The isolating component is a non-magnetic body.

The two-layer magnetic component may also be an upper magnetic layer of small coercive force on top of a lower magnetic layer of large coercive force, or vice versa.

In another embodiment, the magnetic component mentioned above may include a plurality of magnetic layers alternating between magnetic layers of small coercive force and magnetic layers of large coercive force.

A second magnetic recording medium of the present invention comprises a non-magnetic substrate, an under layer, a magnetic layer, a protective layer in that order. The under layer, magnetic layer, and protective layer are formed one on top of another on the non-magnetic substrate. The magnetic layer consists of a plurality of first magnetic components, and second magnetic components. Each of the first magnetic components is embedded in an even and orderly manner in the second magnetic component. The coercive force of the first and a second magnetic components differ from each other.

The first magnetic component stated above may be made of a body of large coercive force, and a second magnetic component may be made of a body of small coercive force.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 8(a) through FIG. 8(e) are cross-sectional views showing the steps in the manufacturing process a magnetic recording medium of the present invention.

FIG. 9(a) shows the effect of the present invention.

FIG. 9(b) shows the effect of the conventional medium.

DETAILED DESCRIPTION OF THE PREFERRED EMBODIMENT

There are provided two types of structures of a magnetic recording medium of the present invention. The first structure is shown in FIG. 1(a) to FIG. 5(b). The second structure is shown in FIGS. 6(a)–7(c).

Figure 1A:
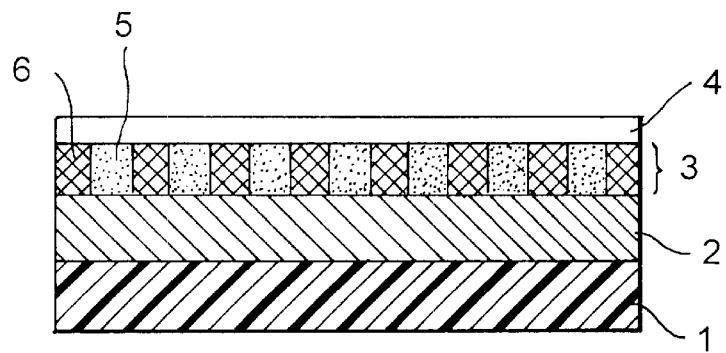
FIG. 1(a) is a cross-sectional view of a magnetic recording medium according to an embodiment of the invention.

Referring to FIG. 1(a), a magnetic recording medium includes a non-magnetic substrate 1 on which are deposited, in order, an under layer 2, a magnetic layer 3 (a layer for data recording), and a protective layer 4. It is conventional to use single crystal silicon, aluminum, or glass to make non-magnetic substrate 1. The under layer 2 is formed conventionally using Cr, CrW, CrMo, NiP, NiAl, and TiCr. Under layer 2 governs the orientation of crystal axis in the magnetic layer 3 formed thereon.

Figure 1B:
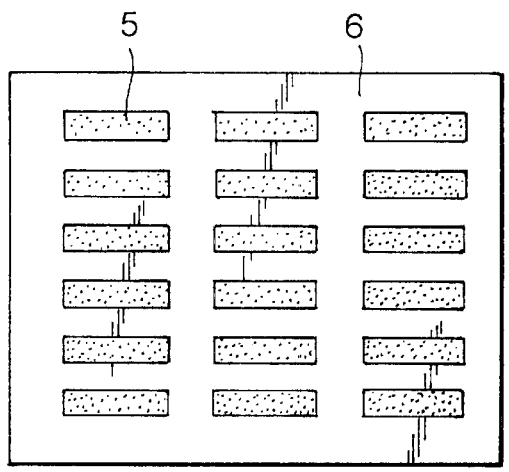
FIGS. 1(b) and 1(c) are plan views of magnetic recording media according to the invention showing possible patterns of magnetic regions, as viewed from a protective layer side.
Figure 1C:
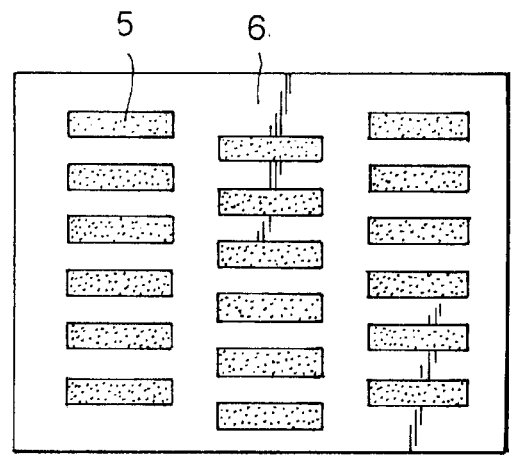

Magnetic layer 3 consists of a plurality of magnetic component 5, evenly spaced apart in an isolating component 6. Two possible patterns of magnetic component 5 in isolating component are shown in FIGS. 1(b) and 1(c). These patterns are seen through protective layer 4.

Magnetic component 5 consists of a soft magnetic layer 7 made of a magnetic material having a small coercive force, and a hard magnetic layer 8 made of a material having a large coercive force. The two-layer structure of magnetic component 5 is formed on under layer 2, with the soft magnetic layer 7 positioned below, and the hard magnetic layer 8 positioned above.

Suitable materials of small coercive force includes, for instance, cobalt metal, Permalloy, sendust, and cobalt-hafinium-tantalum alloy. Suitable materials of large coercive force include such metal alloys as cobalt-chromium, cobalt chromium-tantalum-platinum, cobalt-chromium-tantalum-platinum-boron.

Figure 2:
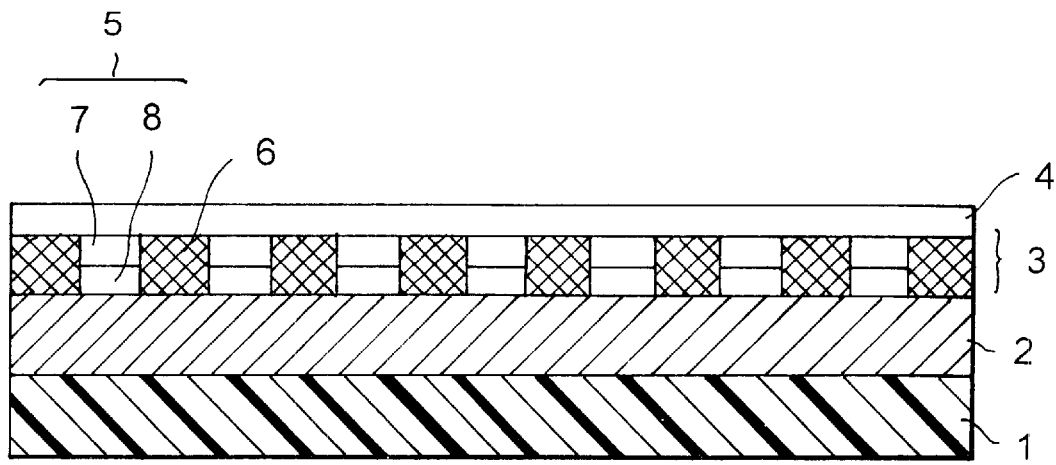
FIG. 2 is a cross-sectional view of a magnetic recording medium of the present invention.

Referring to FIG. 2, a second type of magnetic component 5 in a magnetic layer 3 may be inverted from the embodiment of FIG. 1(a). That is, the hard magnetic layer 8 may be positioned at the bottom with the soft magnetic layer 7 positioned above.

Figure 3:
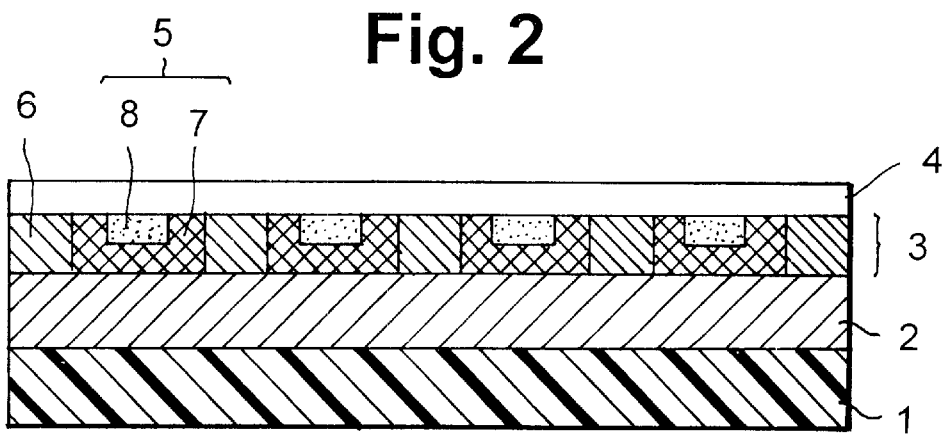
FIG. 3 is a cross-sectional view of another magnetic recording medium of the present invention.

Referring to FIG. 3, a third type of magnetic component 5 in magnetic layer 3 has a soft magnetic layer 7 with a recess in its upper surface. The hard magnetic layer 8 is deposited in the recess.

Figure 4:
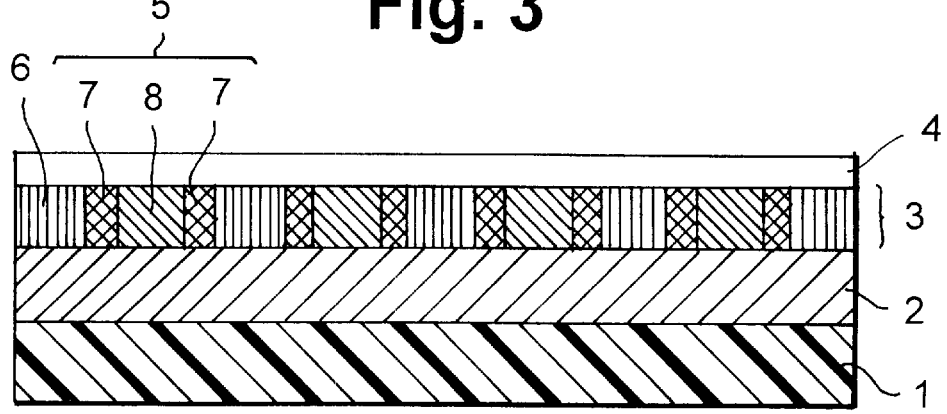
FIG. 4 is a cross-sectional view of another magnetic recording medium of the present invention.

Referring now to FIG. 4, a fourth type of magnetic component 5 in a magnetic layer 3 is formed with a hard magnetic layer 8 embedded through a soft magnetic layer 7 to contact the under layer 2. In this embodiment, the hard and soft magnetic layers are side by side, but are isolated from their neighbors by surrounding isolating components.

Figure 5A:
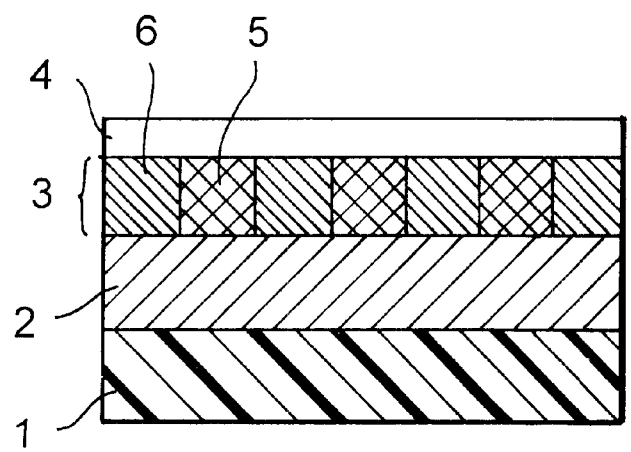
FIG. 5(a) is a cross section of another magnetic recording medium of the present invention taken transverse to the magnetic components.
Figure 5B:
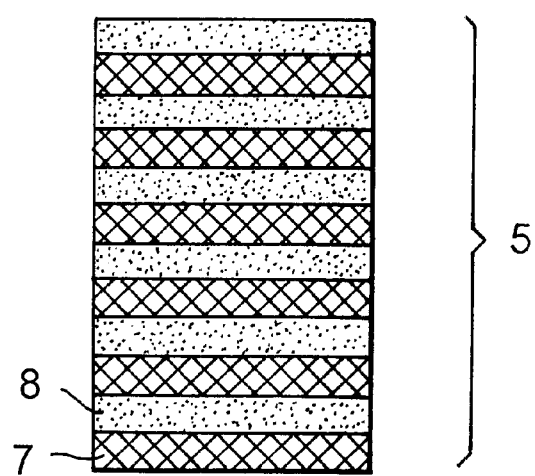
FIG. 5(b) is an enlarged cross section of the magnetic component the magnetic component to show multiple (12) layers.

Referring now to FIGS. 5(a) and 5(b), FIG. 5(b) is an enlargement of a magnetic component 5 of FIG. 5(a). FIG. 5(b) is a fifth type of magnetic component 5 in a magnetic layer 3 may have more than two alternating layers of a soft magnetic layer 7 and a hard magnetic layer 8. The number of layers may be increased to, for example, the 12 layers shown in FIG. 5(b).

Isolating component 6 may be made of any suitable non-magnetic material, including silicon oxide and poly-methylmethacrylate. Naming these materials should not be construed as being a limitation on the materials which may be used for this function.

Protective layer 4 is formed on top of the magnetic layer 3. Conventional diamond-like carbon is employed in the protective layer.

Figure 6A:
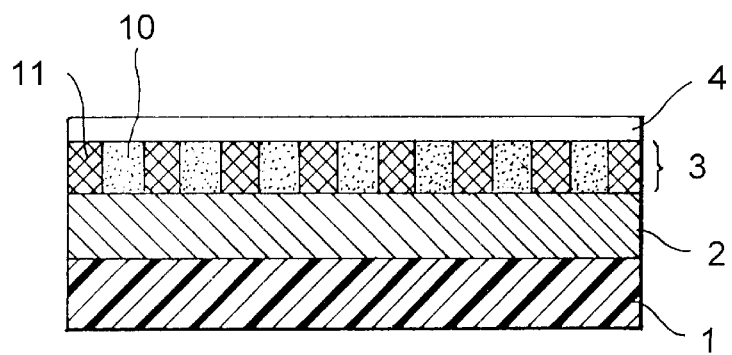
FIG. 6(a) is a cross-sectional view of a magnetic recording medium according to another embodiment of the invention.
Figure 6B:
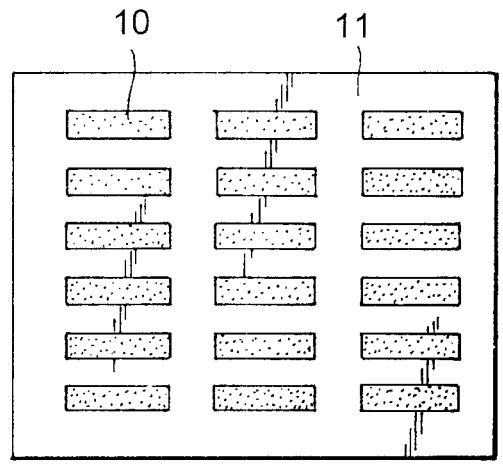
FIGS. 6(b) and 6(c) are plan views of the magnetic recording medium of FIG. 6(a) showing two possible layouts of the magnetic layer as viewed from a protective layer side.
Figure 6C:
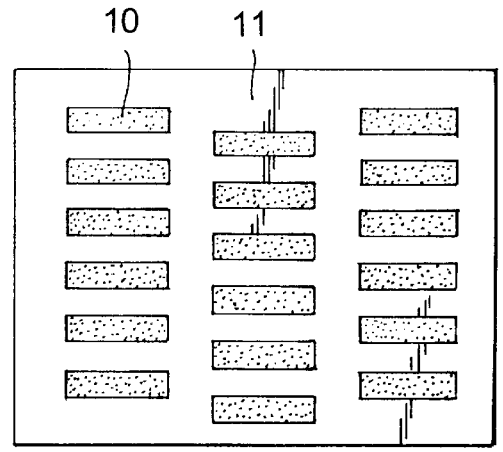

Referring now to FIGS. 6(a)–6(c), a second type of magnetic recording medium includes a non-magnetic substrate 1, an under layer 2, a magnetic layer 3, and a protective layer 4. The under layer 2, magnetic layer 3, and protective layer 4 are formed in that order one on top of another on the non-magnetic substrate 1. The non-magnetic substrate 1, under layer 2, and protective layer 4 in the second magnetic recording medium may be the same as corresponding materials in the a first type of magnetic recording medium described above.

Magnetic layer 3 in a second magnetic recording medium consists of a first magnetic component 10 and a second magnetic component 11. The first magnetic component 10 is embedded in an even and orderly manner in second magnetic component 11. FIG. 6(b) and FIG. 6(c) is a plan view of a second magnetic recording medium taken through a protective layer 4 respectively. The array pattern of the first magnetic component in the second magnetic recording medium is identical with that of magnetic component 5 (FIGS. 1(b) and 1(c)) in the first magnetic recording medium. The first magnetic component 10, corresponds to the magnetic component 5 in the first magnetic recording medium. The second magnetic component 11, which corresponds to the non-magnetic isolating component 6 in a first magnetic recording medium, instead of being non-magnetic, is a magnetic material that has a coercive force that is different than the coercive force of the first magnetic component. In another difference, the first magnetic component 10 is composed of one layer, instead of the plurality of layers in the first magnetic recording medium. The first magnetic component 10 is preferably a body of large coercive force, and the second magnetic component 11 preferably a body of small coercive force. The materials listed above as typifying materials of large and small coercive force may be employed.

One can visualize the first magnetic components 10 of FIGS. 6(a)–6(c) as columns passing completely through the second magnetic component 11.

Figure 7A:
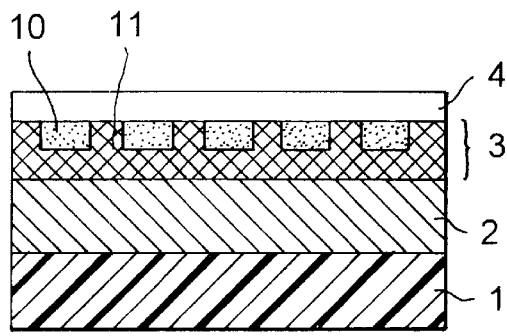
FIG. 7(a) is a cross-sectional view of the magnetic recording medium according to another embodiment of the invention.
Figure 7B:
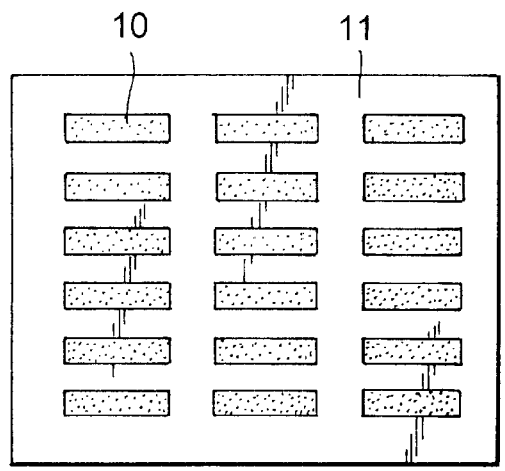
FIGS. 7(b) and 7(c) are plan views of the magnetic layer of FIG. 7(a) showing two possible layouts of the magnetic layer as viewed from a protective layer side.
Figure 7C:
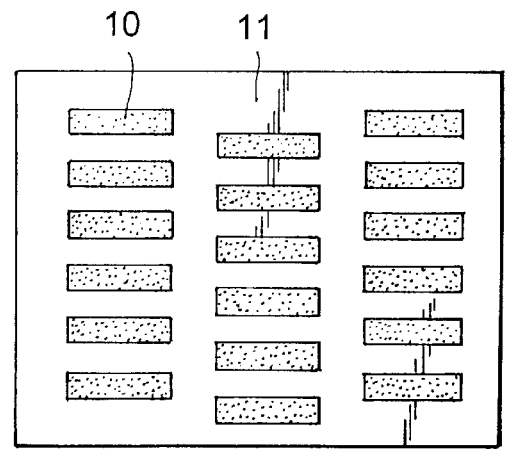

Referring now to FIGS. 7(a)–7(c), in another embodiment a plurality of first magnetic component 10 are embedded part-way through the second magnetic component 11. This positions first magnetic component 10 spaced apart from the under layer 2.

Referring now to FIGS. 8(a) through 8(e), a typical manufacturing method for making the first magnetic recording medium shown in FIGS. 1(a)–1(c) is shown for completeness of disclosure, but is not offered by way of limitation.

Under layer 2, preferably 5 to 70 nm thick, is formed on a non-magnetic substrate 1 using magnetron sputtering or electron-beam deposition under a pressure of a few milli Torr. An isolating layer 9, which is 5 to 20 nm thick, is formed on the under layer 2. In the finished device the isolating layer 9 is processed to become the isolating component 6 on the under layer 2. The isolating layer 9 is deposited using plasmatic chemical vapor deposition or magnetron sputtering.

Then, the isolating layer 9 is patterned with holes of an even and order distributed to form an isolating component 6 as shown in FIG. 8(b). The holes are formed by applying a poly-methylnethacrylate photosensitive resin membrane onto the isolating layer 9. The membrane is exposed through a pattern mask to an electron-beam which produces a latent image pattern in the poly-methylmethacrylate membrane. The membrane is etched to remove the portion of the pattern representing the areas between the isolating components 6. Then the isolating layer 9 is etched with reactive ions to produce the pattern of holes in the isolating layer 9 to form the isolating component 6. The method is not offered by way of limitation. The holes are desirably circular cylinders with a diameter of 100 nm or less, of quadratic prisms with sides of 200 nm or less. The cylindrical and prism shapes are merely suggestions and are not offered by way of limitation.

Referring now to FIG. 8(c), a soft magnetic layer 7, which is 10 to 300 nm thick, is formed over the entire surface of the layers of FIG. 8(b). A hard magnetic layer 8, which is 10 to 300 nm thick, is formed atop the soft magnetic layer 7. These layers are formed under appropriate film-making conditions using, for example, magnetron sputtering or electron-beam deposition, to produce the intermediate product shown in FIG. 8(c). The combined thickness of the soft magnetic layer 7 and the hard magnetic layer 8 should exceed the thickness of the isolating component 6.

Figure 8D:
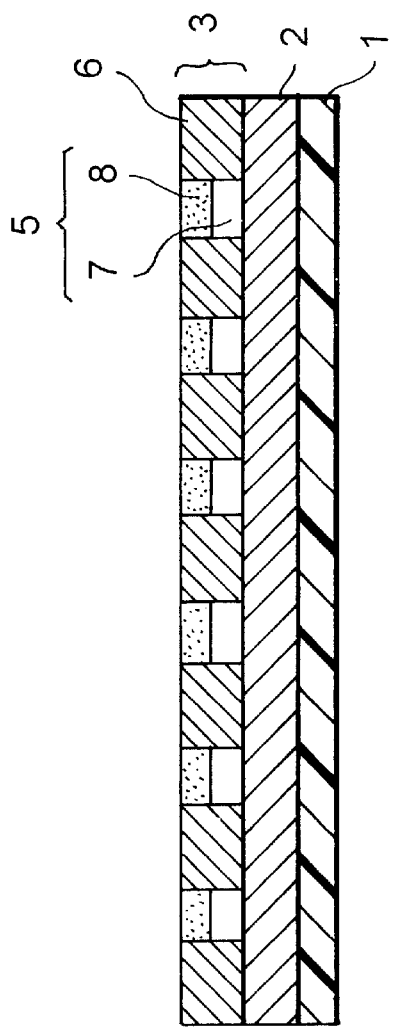

Referring now to FIG. 8(d), the upper surface is polished to completely remove unwanted layers atop isolating components 6, and produce a smooth top surface. Polishing may include, for example, chemomechanical polishing with silicon oxide or aluminum oxide as a polishing powder.

Figure 8E:
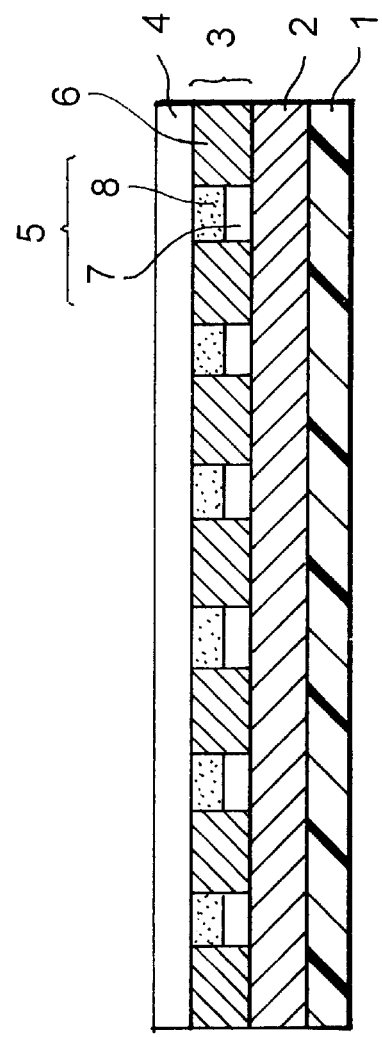
Figure 10A:
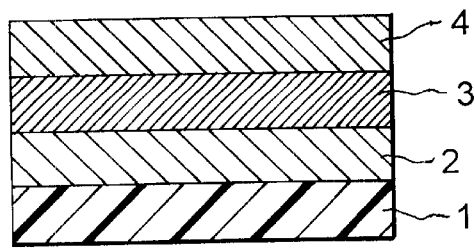
FIG. 10(a) is a cross-sectional view of a magnetic recording medium according to the prior art.
Figure 10B:
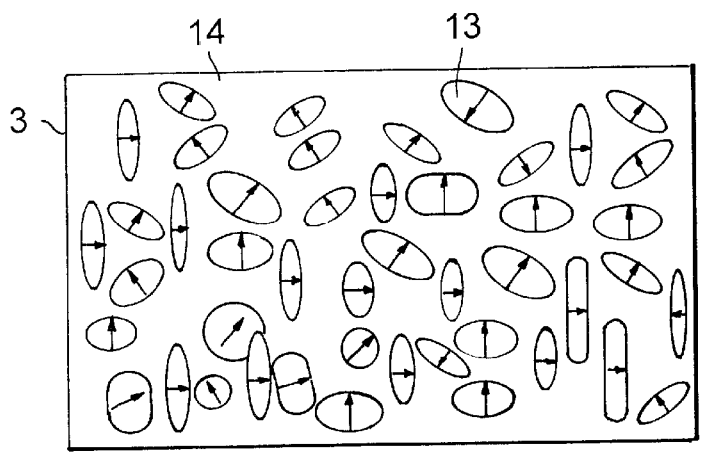
FIG. 10(b) is a schematic view of a the direction of magnetization of magnetic grains in a conventional magnetic layer of the medium.
Figure 11:
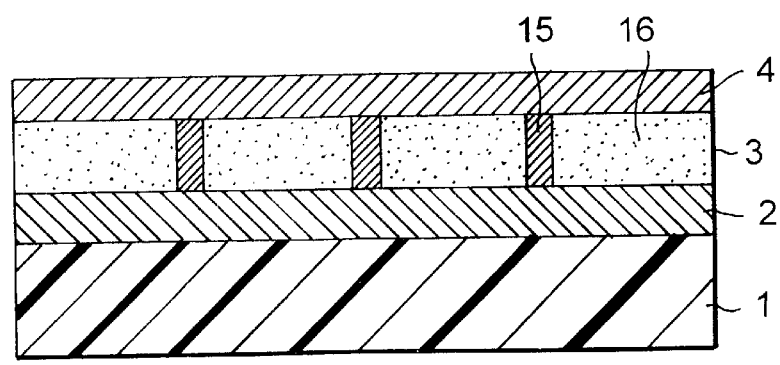
FIG. 11 is a cross-sectional view of a conventional quantized magnetic domain (QMD) recording medium.

Referring now to FIG. 8(e), in the final step, the protective layer 4 is formed on the smooth surface. The resulting device is the first magnetic recording medium shown in FIGS. 1(a)–1(c).

Similar conventional solid-state processing techniques may be used to produce the second magnetic component 11 on an under layer 2 instead of on an isolating component 6. One skilled in the art will recognize the conventional techniques may be used to put bodies of large coercive force into holes in a magnetic layer to produce the first one-layered magnetic component 10. The surface is then polished for removal of unwanted materials and for smoothing the surface. Finally, the protective layer 4 is formed on the surface to provide the second magnetic recording medium.

Referring now to FIG. 9(a), a typical illustration in cross section of the first magnetic recording medium of FIGS. 1(a)–1(c). FIG. 9(b) is a typical illustration in cross section of a conventional magnetic recording medium containing a single layer of a hard magnetic layer 8. Arrows in the figures denote the direction of magnetization recorded, that is, magnetized in the indicated direction of each magnetic component. In a conventional magnetic recording medium, the magnetic field of a magnetic component permeates through a non-magnetic isolating component 6. As a consequence, the attempt to isolate hard magnetic components 8 using isolating components 6 in the conventional magnetic recording medium does not eliminate magnetic interference of one magnetic component on the neighboring magnetic components. In contrast, the magnetic component of the present invention composed, of a double layer of a soft and a hard magnetic component, as shown in FIG. 9(a) causes the magnetic field of the hard magnetic layer 8 to magnetize the soft magnetic layer 7 in a reverse direction. Hence, the soft magnetic layer 7 and hard magnetic layer 8, placed side by side, form a loop of a magnetic circuit. This eliminates cancellation of magnetization of neighboring hard magnetic components. This stabilizes the magnetization of the hard magnetic layer 8, and reduces the effect exercised by materials of a magnetic component on coercive force.

EXAMPLE 1

A first magnetic recording medium, as shown in FIGS. 1(a)–1(c), was manufactured as follows. A chromium under layer 2, which is 50 nm thick, was formed on a silicon non-magnetic substrate by magnetron sputtering at a pressure of a few milli Torr. A silicon oxide isolating layer 9 of 20 nm thickness was formed on the under layer 2 using plasmatic chemical vapor deposition, following the method shown in FIGS. 8(a)–8(e).

Poly-methylmethacryl ate resin membrane, 50 nm thick, was applied onto the isolating layer 9, and patterned with a latent image of quadratic prisms. The pattern was formed by exposing the surface to an electron beam though a mask. The quadratic prism holes were then produced, 100 nm in length, 200 nm in breadth, and 50 nm in height by etching in a solution of 2 parts isopropyl alcohol and one part isobutylketone. A chromium film, 10 nm thick, was deposited by electron-beam sputtering on the poly-methylmethacrylate membrane, containing the developed holes therein, at a pressure of some $7\times10^{-7}$ Torr. Supersonically activated acetone, at 50 to 70° C., was applied to the chromium-deposited substrate to produce the pattern of holes in the isolating layer 9 to give an isolating component 6. Then the poly-methylmethacrylate membrane and chromium deposited thereon was removed as shown in FIG. 8(b).

Soft magnetic layer 7, made of $Fe_{21.5}N_{78.5}$ and 10 nm thick, and a hard magnetic layer 8, made of CoCrTaPt and 15 nm thick, was formed consecutively on the under layer 2 closing one end of the patterned hole, These steps were performed using magnetron sputtering to produce the intermediate product shown in FIG. 8(c). The soft magnetic layer 7 and the hard magnetic layer 8 were formed in an argon gas atmosphere at a pressure of a few milli Torr, using a committed electric power of some 5 W/cm².

Forming the soft magnetic layer 7 and the hard magnetic layer 8 on the under layer 2 is accompanied by depositing the soft magnetic layer 7 and the hard magnetic layer 8 on the isolating component 6, thereby roughening the surface of the medium under manufacture. Chemomechanically polishing the surface with silicon oxide or aluminum oxide polishing powder, 0.05 μm across, removes the soft magnetic layer 7 and hard magnetic layer 8 from the top of the isolating component 6, thereby giving a smooth surface of a medium under manufacture as shown in FIG. 8(d). Finally, magnetron sputtering of a graphite target forms a diamond-like carbon protective layer 4 on the smooth surface as shown in FIG. 8(e).

The above process formed the a magnetic recording medium of example 1. A magnetic field at which magnetization of the medium is reversed was examined with magnetic force microscopy while varying the magnetic field over the magnetic recording medium. Finding reveals that the magnetic recording medium reverses its magnetization at a magnetic field of some 3500 Oe.

Comparative Example 1

A magnetic recording medium was manufactured in the same way as that referred to in example 1 except that a single magnetic layer in the medium of comparative example 1 was formed in a single-layer continuum, 10 nm thick, with CoCrTaPt alloy.

A magnetic field giving rise to reversal in magnetization of the medium was examined with a vibrating sample magnetometer. Findings reveal that the magnetic recording medium of comparative example 1 reverses its magnetization at a magnetic field of some 2500 Oe.

Comparative Example 2

A magnetic recording medium was manufactured in the same way as that referred to in example 1 except that a magnetic component in the medium of comparative example 2 was composed of a single layer of a body of large coercive force. A magnetic component in the medium of example 1 was composed of a double layer of a body of small coercive force and a body of large coercive force.

Applying magnetic force microscopy to the medium with a magnetic field over the magnetic recording medium varied finds the magnetic field at which magnetization reverses. Findings reveal that the magnetic recording medium of comparative example 2 reverses its magnetization at a magnetic field of some 3000 Oe.

Example 2

A first magnetic recording medium shown in FIGS. 2(a)–2(c) was manufactured in the same way as in example 1, except that a soft magnetic layer 7 was formed on top of a hard magnetic layer 8. That is, the locations of the soft magnetic layer 7 and the hard magnetic layer 8 are interchanged from example 1.

Stability in magnetization of the medium was studied in the same way as that in example 1 to find that the medium in example 2 reverses magnetization at a magnetic field of some 3500 Oe.

Example 3

A third of a first magnetic recording medium shown in FIG. 3 was manufactured in the following way.

An under layer 2 was formed on a non-magnetic substrate 1. An isolating layer 6 was formed by patterning holes part way through an isolating layer 9 in the same way as that in example 1. Then, a soft magnetic layer 7 was formed higher in the holes patterned in the isolating layer 9, followed by chemomechanical polishing to give a flat surface of a medium under manufacture.

Applying poly-methylmethacrylate resin membrane, patterning with electron beam, and etching a soft magnetic layer 7 with reactive ions for the second time gives recesses into which a hard magnetic layer 8 is deposited. Finally, forming and flattening a hard magnetic component provides a magnetic recording medium shown in FIG. 3.

The stability in magnetization of the medium was studied in the same way as that in example 1 to find that the medium in example 3 reverses magnetization at a magnetic field of 3500 Oe.

Example 4

A fourth of a first magnetic recording medium as shown in FIG. 4 was manufactured as in example 3 above except that holes leading to the under layer 2 are formed instead of forming recesses in the soft magnetic layer 7, the hard magnetic layer 8 in this example comes into contact with the under layer 2.

Stability in magnetization of the medium was studied in the same way as that in example 1 to find that the medium in example 4 reverses magnetization at a magnetic field of 3500 Oe.

Example 5

The other of a first magnetic recording medium shown in FIGS. 5(a)–5(b) was manufactured in the same way as one of a first magnetic recording medium shown in FIGS. 1(a)–1(c) except that alternating layers of the soft magnetic layer 7 and hard magnetic layer 8 having smaller thickness of 2 nm are laid alternately one on top of another.

Stability in magnetization of the medium was studied in the same way as that in example 1 to find that the medium in example 5 reverses magnetization at a magnetic field of 3500 Oe.

Example 6

A second magnetic recording medium, as shown in FIGS. 6(a)–6(c) was manufactured by patterning holes in an isolating layer 11 of a second magnetic recording medium in the same way as used to produce the first magnetic recording medium of example 1, except that an isolating layer 11, $Fe_{21.5}Ni_{78.5}$, was made instead of silicon oxide isolating layer 6. Then, forming a first magnetic component 10 higher in the holes, polishing chemomechanically to give a smooth surface provides one of a second magnetic recording medium shown in FIG. 6.

Stability in magnetization of the medium was studied in the same way as that in example 1 to find that the medium in example 6 reverses magnetization at a magnetic field of 3500 Oe.

Example 7

Another of a second magnetic recording medium shown in FIGS. 7(a)–7(c) was manufactured as described below.

Patterning holes in an isolating layer 11 of a second magnetic recording medium was made in the same way as a first magnetic recording medium in example 1 except that an isolating layer 11 was made of $Fe_{21.5}Ni_{78.5}$ instead of silicon oxide, and recesses are formed in the isolating layer 11 instead of through holes. Then, a first magnetic component 10 is formed higher in the recesses. The surface is polished chemomechanically to give a first magnetic component 10 embedded in a second magnetic component 11 without the first magnetic component coming into contact with an under layer 2. The polishing smooths the surface of the medium under manufacture to provides another of a second magnetic recording medium shown in FIGS. 7(a)–7(c).

The stability in magnetization of the medium was studied in the same way as that in example 1 to find that the medium in example 7 reverses magnetization at a magnetic field of some 3500 Oe.

EFFECT OF THE INVENTION

Placing magnetic components of differing coercive force side by side in a magnetic layer of the present invention provides a magnetic recording medium with a magnetic layer with improved thermal stability, and less subject to materials it includes in magnetization in marked contrast to a conventional medium.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic recording medium comprising:

a non-magnetic substrate;

an under layer on said substrate;

a magnetic layer on said under layer;

a protective layer on said magnetic layer;

said magnetic layer containing a plurality of magnetic component, and an isolating component;

each of said magnetic components being embedded in a pattern in said isolating component;

each of said magnetic components including a hard magnetic layer and a soft magnetic layer;

said hard magnetic layer having a larger coercive force than said soft magnetic layer;

said hard magnetic layer and said soft magnetic layer being disposed adjacent each other; and said isolating component being a non-magnetic body.

2. The magnetic recording medium as set forth in claim 1, wherein said hard magnetic layer is above said soft magnetic layer.

3. The magnetic recording medium as set forth in claim 1, wherein said soft magnetic layer is above said hard magnetic layer.

4. The magnetic recording medium as set forth in claim 1, wherein a plurality of said hard magnetic layer and soft magnetic layer are disposed in alternating layers.

5. A magnetic recording medium comprising:

a non-magnetic substrate;

an under layer;

a magnetic layer; and a protective layer, said under layer, magnetic layer, and protective layer being formed consecutively on said non-magnetic substrate one on top of another;

said magnetic layer having a plurality of a hard magnetic component, and a soft magnetic component; and each of said hard magnetic components being embedded in a pattern in said soft magnetic component, and said hard and soft component differing in coercive force from each other.

6. The magnetic recording medium as set forth in claim 5, wherein said hard magnetic component is a body of larger coercive force than said soft magnetic component.

7. A magnetic recording medium comprising:

a non-magnetic substrate;

a magnetic layer on said substrate;

said magnetic layer including a plurality of magnetic bodies in a pattern in a non-magnetic body;

each of said magnetic bodies including at least a first magnetic material and a second magnetic material; and said first magnetic material and said second magnetic materials having different magnetic coercive force.

8. A magnetic recording medium according to claim 7, wherein said first and second magnetic materials are deposited in abutting layers.

9. A magnetic recording medium according to claim 8, wherein said first magnetic material is on top of said second magnetic material.

10. A magnetic recording medium according to claim 8, wherein said second magnetic material is on top of said first magnetic material.

11. A magnetic recording medium according to claim 8 wherein said first and second magnetic materials include at least four alternating interleaved layers.

12. A magnetic recording medium according to claim 7 wherein:

one of said first and second magnetic materials has an indentation in its upper surface; and the other of said first and second magnetic materials is disposed in said indentation.

13. A magnetic recording medium according to claim 7, wherein said first and second magnetic materials are disposed side by side passing substantially through said non-magnetic layer.

14. A magnetic layer for a magnetic recording medium comprising:

a non-magnetic isolating component;

a plurality of magnetic bodies in a pattern in said isolating component;

said plurality of magnetic bodies and said isolating component forming magnetic layer of a quantized magnetic disk;

each of said plurality of magnetic bodies including a soft magnetic body and a hard magnetic body;

said soft magnetic body having a coercive force that is smaller than a coercive force of said hard magnetic body; and said hard magnetic body abutting said soft magnetic body.

* * * * *